United States Patent [19]

Marti

[11] Patent Number: 5,033,929
[45] Date of Patent: Jul. 23, 1991

[54] AUTOMATIC APPARATUS FOR FEEDING A BOTTLING LINE

[76] Inventor: Jaime S. Marti, Emancipacion no. 8, Barcelona, Spain

[21] Appl. No.: 444,801

[22] Filed: Dec. 1, 1989

[30] Foreign Application Priority Data

Dec. 2, 1988 [FR] France ................. 88 16408

[51] Int. Cl.⁵ .................................... B65G 65/23
[52] U.S. Cl. ...................... 414/403; 414/421; 414/422; 414/797; 414/783; 414/796.4; 414/796.7; 414/737; 414/741; 414/736; 414/225
[58] Field of Search .............. 414/403, 413, 419, 420, 414/421, 404, 796.4, 796.9, 797, 797.1, 736, 737, 783, 763, 741, 222, 225, 226, 751, 752

[56] References Cited

U.S. PATENT DOCUMENTS

| | | |
|---|---|---|
| 2,453,077 | 11/1948 | Newton . |
| 2,729,344 | 1/1956 | Birchall . |
| 3,490,630 | 1/1970 | Sullivan ............... 414/422 X |
| 3,543,949 | 12/1970 | Weier . |
| 3,598,268 | 10/1971 | Wallace .............. 414/421 X |
| 3,976,205 | 8/1976 | Göransson ............ 414/783 |
| 4,032,022 | 6/1977 | Smith ............... 414/796.4 X |
| 4,302,142 | 11/1981 | Kuhl et al. ........... 414/796.9 X |
| 4,527,940 | 7/1985 | Biery ................. 414/420 X |
| 4,681,209 | 7/1987 | Marti . |
| 4,753,564 | 6/1988 | Pearce et al. ........ 414/797 X |

FOREIGN PATENT DOCUMENTS

| | | |
|---|---|---|
| 784065 | 4/1968 | Canada ................. 414/741 |
| 2209698 | 9/1973 | Fed. Rep. of Germany . |
| 2316159 | 1/1977 | France . |
| 2585681 | 2/1987 | France . |

Primary Examiner—Frank E. Werner
Attorney, Agent, or Firm—Fleit, Jacobson, Cohn, Price, Holman & Stern

[57] ABSTRACT

Apparatus for an automatic bottle handling machine (2) operating in conjunction with a bottling line (25), with light material bottles (23) initially orderly arranged on trays or several packings (22) stacked on a pallet (21), comprises a device (1) having grippers (9, 17) for gripping the groups of bottles (23) in a packing (22), transporting (5) the bottles and dumping them out of their packing into a hopper (18) to recover them in bulk, and discharging the packing, an automatic machine (2) to re-erect and align the containers, fed with the bottles in bulk from the device (1), and a bottling line (25) coupled to the automatic machine.

6 Claims, 8 Drawing Sheets

AUTOMATIC APPARATUS FOR FEEDING A BOTTLING LINE

BACKGROUND OF THE INVENTION

1. Field of the Invention

The invention relates to an automatic apparatus for feeding a bottling line with groups of different bottles, or containers, made of light material, such as plastic, initially orderly arranged on trays or several packings stacked on a pallet.

2. Description of the Prior Art

Known devices designed to transfer plastic bottles toward a bottling line are of the type already used with glass bottles, wherein an accumulation table commonly constituted by a plurality of conveyors, adjacent and coplanar, are coupled with a single output carrier. That is to say, the bottles, initially upright, are uprightly handled up to the bottling line and the apparatus is operated so that they all remain so.

Even if the devices are set and achieve excellent results with glass bottles, it is unfortunately not so for light material bottles, such as plastic, which because of their flexibility and lightness provoke jamming and crushing, resulting in the bottles falling over. These drawbacks result in the requirement for surveying and handling personnel in a rather significant number resulting in costs for additional personnel having to be added to equipment costs which are significant.

BRIEF SUMMARY OF THE INVENTION

It is the object of the invention to overcome the above drawbacks by providing a device designed to transfer, in bulk, the bottles initially orderly arranged in different packings, towards a classical type machine that reerects and lines them up, as for example in the U.S. Pat. No. 4,681,209 and the French application No. 87.18194 of the same inventor. These two means assure a correct operation of the assembly evidenced by the re-erecting and lining-up machine, and the possibility to achieve high rates, for a much less onerous investment and it requires no survey personnel.

The invention accomplishes this by providing in combination:
  a. a device for gripping groups of bottles and removing them from out of their packing, recovering them in bulk, and discharging the packings;
  b. automatic re-erecting and aligning machine for containers, fed with the bottles, in bulk, that come from the previous device and coupled to a bottling line;

The device of the invention is comprised generally of:
1. a lifting table for a stack of bottles which operates intermittently upward;
2. a jaw tong (clamp device) designed to grip the packing (cardboard container or plate) and its contents, upturn the assembly to release the bottles and to hold the packing for later discharge; and
3. a hopper to recover the bottles in bulk coupled to a lifting conveyor belt feeding the re-erecting and aligning machine.

BRIEF DESCRIPTION OF THE DRAWINGS

Other characteristics and advantages of the herein disclosed invention will be apparent to those skilled in the art when reading the following detailed description of a preferred embodiment of the invention, given as an example, with reference to the accompanying drawings wherein.

DETAILED DESCRIPTION

Figure 1:
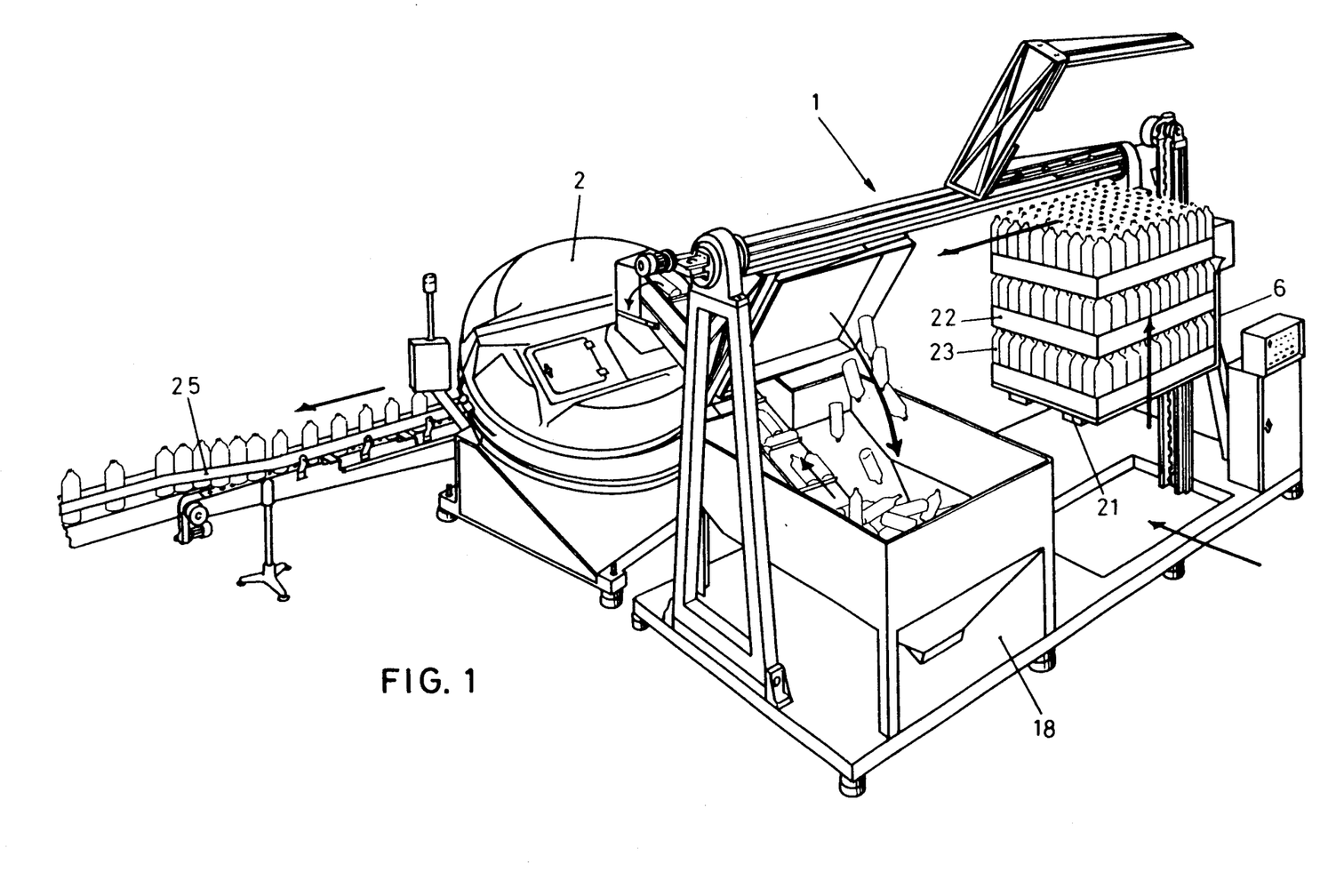
FIG. 1 is a perspective view of the device according to the invention coupled to a bottle re-erecting and aligning automatic machine.

The assembly, shown in FIG. 1, is composed of a device 1 for removing the bottles 23 out of their packing 22, recovering them in bulk and discharging the packings, and a machine 2 for reerecting and aligning the bottles, of the loading receptacle type, having openings carrying the containers along a fixed plane with a discharge aperture, and gravity discharge shafts, whose details are not shown for convenience purposes since they are described in the above U.S. Pat. No. 4,681,204, for example, the machine 2 being fed the bottles in bulk coming from the device 1 and being coupled to the bottling line 25.

The device, shown in FIGS. 2 to 8, has a platform 3 on which are mounted gantries 4 supporting a beam 5, a lifting table 6, driven by a motorization 7 and a chain 8 for displacement stepwise, level by level, a height corresponding to that of a packing with detection of the level in such a way that the top packing is in position for engagement by the related gripper device. The gripper is a jaw tong device 9 whose arms or jaws 9' are adjustable in width and includes retaining means such as sucking disks 10 for holding the packing 22 during the conveying and emptying of its contents and subsequently releasing it. The tong forms one piece with the beam 5 by means of a guide, such as an assembly of shafts 11 on which slide hubs 12 for supporting the tong device on beam 5. The device further has kinematics, such as a motoreducer assembly 13, endless chain 14 and pinions 15, actuated for lengthwise to-and-fro movement of the tong. Beam 5 is actuated for rotational movement, at 180 degree intervals, by a means such as a motoreducer 16. A second jaw tong 17, of the same type as 9 is mounted on beans 5 opposite thereto in such a way that when the first tong 9 is in the loading area, the second one 17 is in the unloading area, and vice versa. When the first tong 9 discharges the bottles in the packing 22 engaged thereby, the second one 17 grips the following, or next, packing, and vice versa.

A recovery hopper 18 receives the bottles in bulk and a lifting conveying belt 19 is combined therewith to feed the bottles to machine 2, as shown in FIG. 1. A conveying belt 24 is provided for recovery of the empty packings released from the tongs. A control and deriving cabinet 20 controls and drives all the mechanisms and drives.

Figure 2:
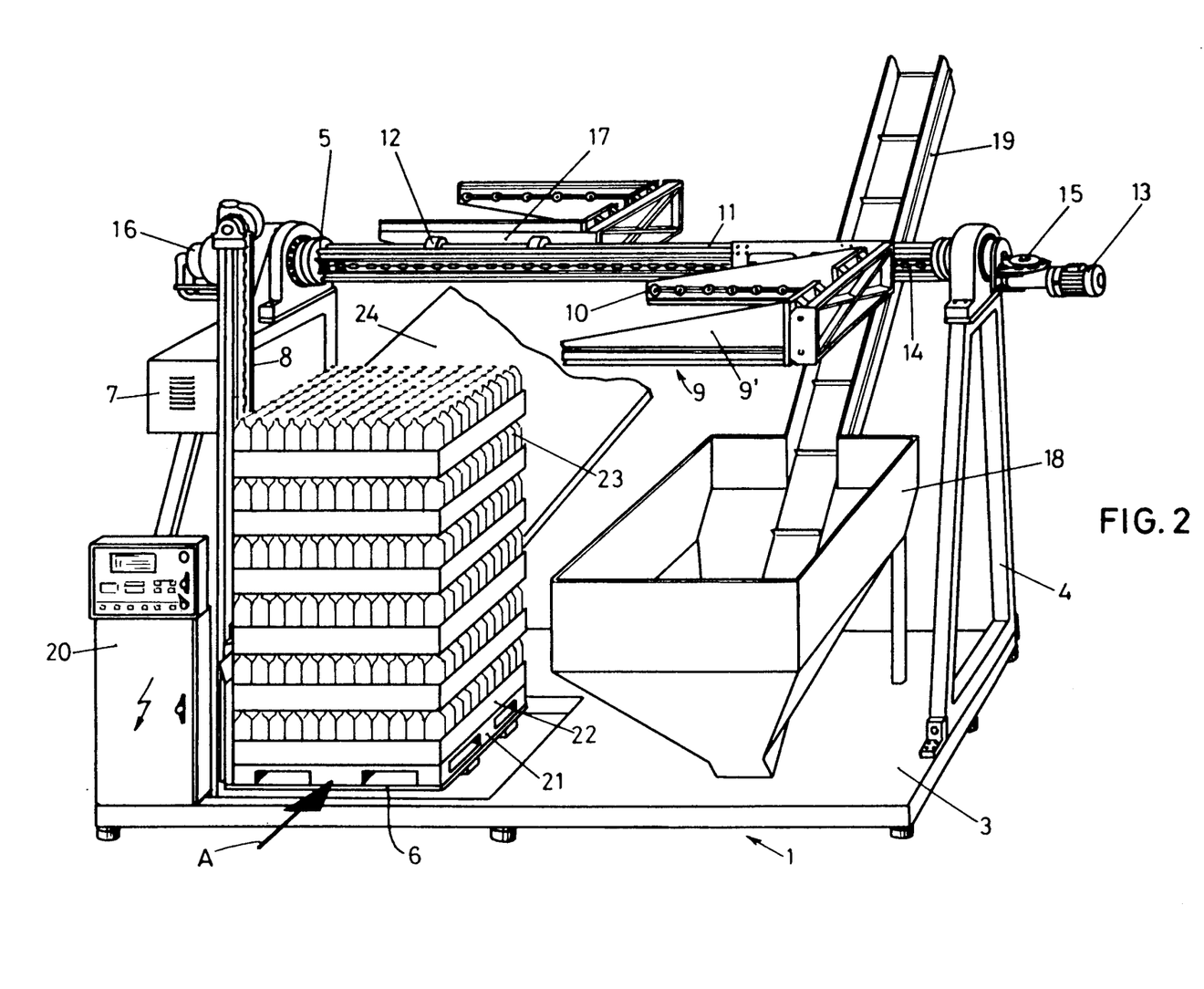
FIGS. 2 to 8 are the same perspective view of the device of the invention slowing successive stages of operation of the device, as it will be described, step by step, referring to the drawings below.

The operation of the assembly will now be described. FIG. 2 shows introduction of the pallets 21 onto the lifting table 6 in the direction of the arrow A.

Figure 3:
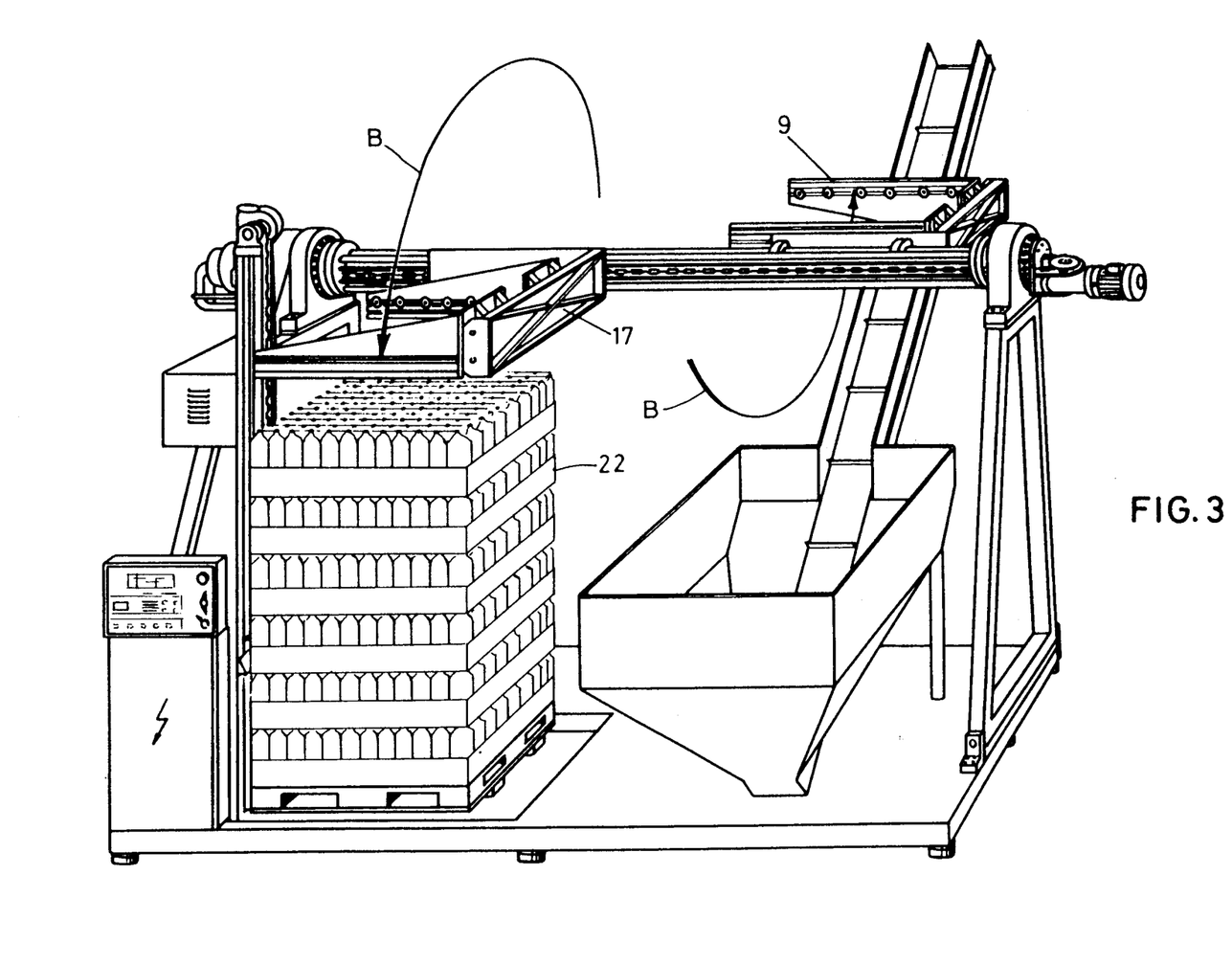

FIG. 3 shows positioning of the tong 17 by rotating beams 5 to the upright position for gripping engagement with a packing 22.

Figure 4:
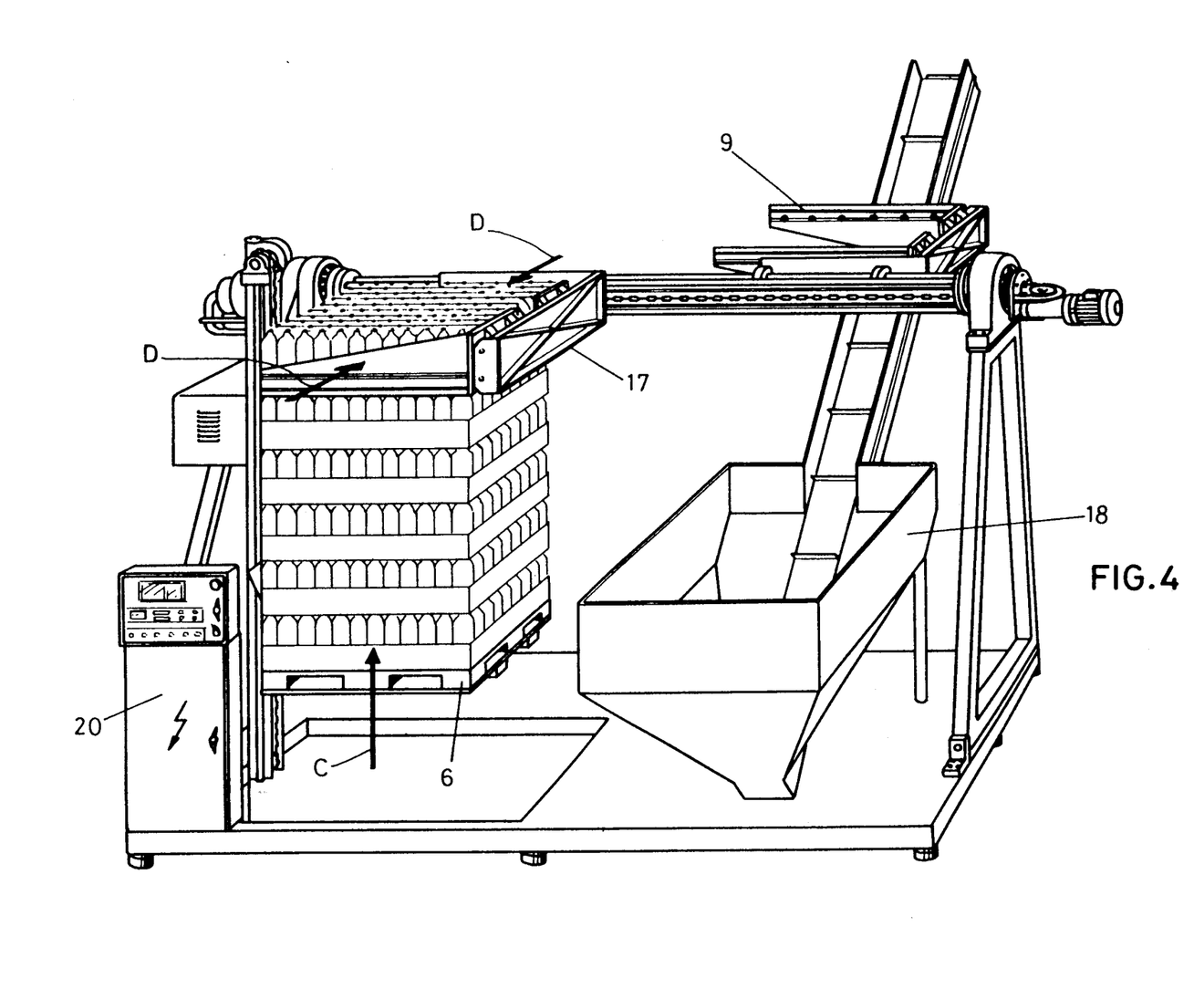

FIG. 4 shows one level upright displacement of the lifting table in the direction of arrow C and engagement of a packing and its contents by the jaws of tong 17 moved in the direction of arrows D.

Figure 5:
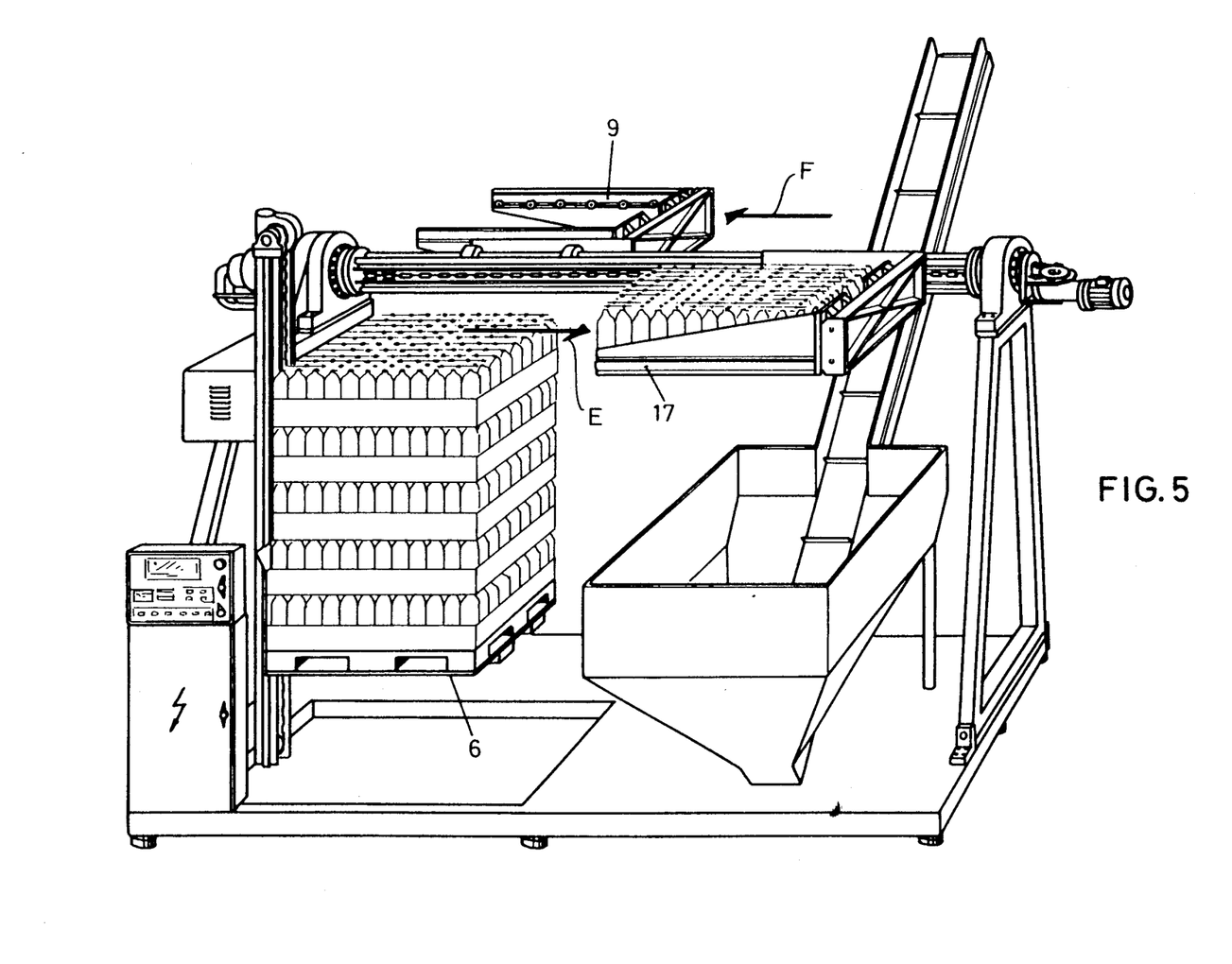

FIG. 5 shows displacement in the direction of arrow E of tong 17 to the bottle recovery area, and displacement of tong 9 in the opposite direction of arrow F.

Figure 6:
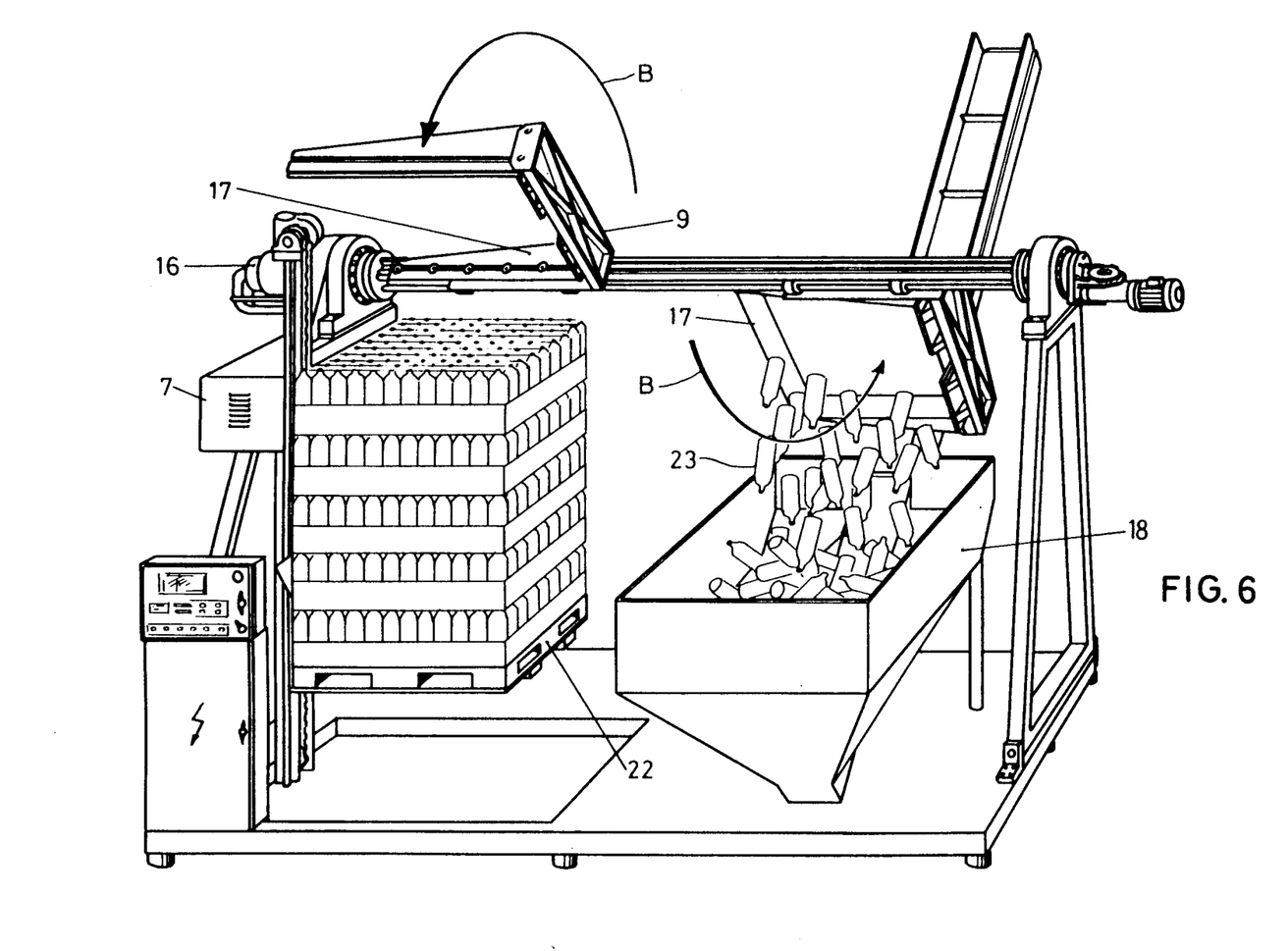
Figure 7:
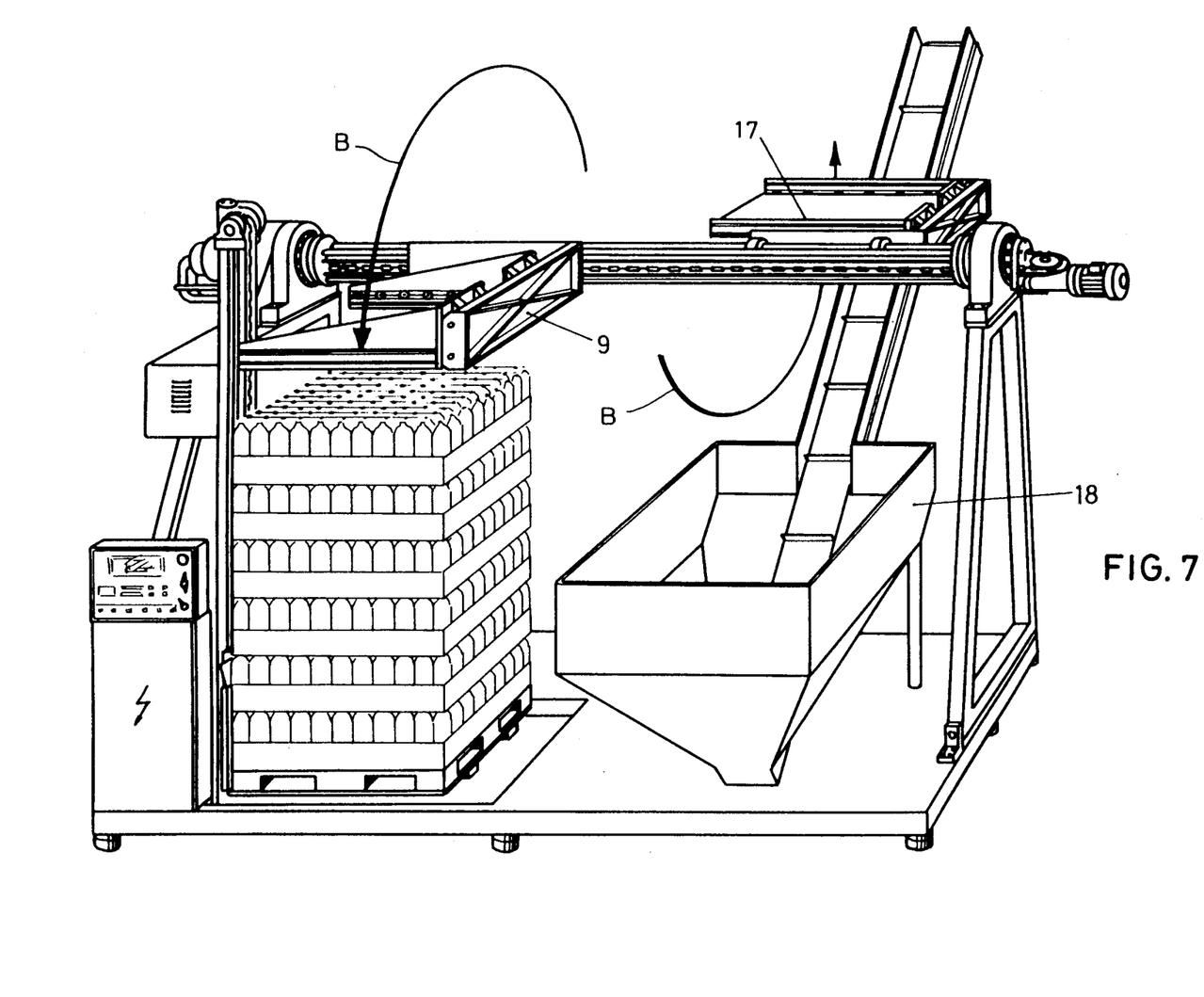

FIG. 6 shows rotation of beam 5 part way through 180 degrees, and of tongs 17 and 9 from the position shown in FIG. 5 toward that of FIG. 7 for dumping the bottles 23 into hopper 18 while retaining the packing by sucking disks 10, and tong 9 moving into the position for engaging the next packing 22.

FIG. 7 shows displacement of tong 9 into position for engagement with a new packing.

Figure 8:
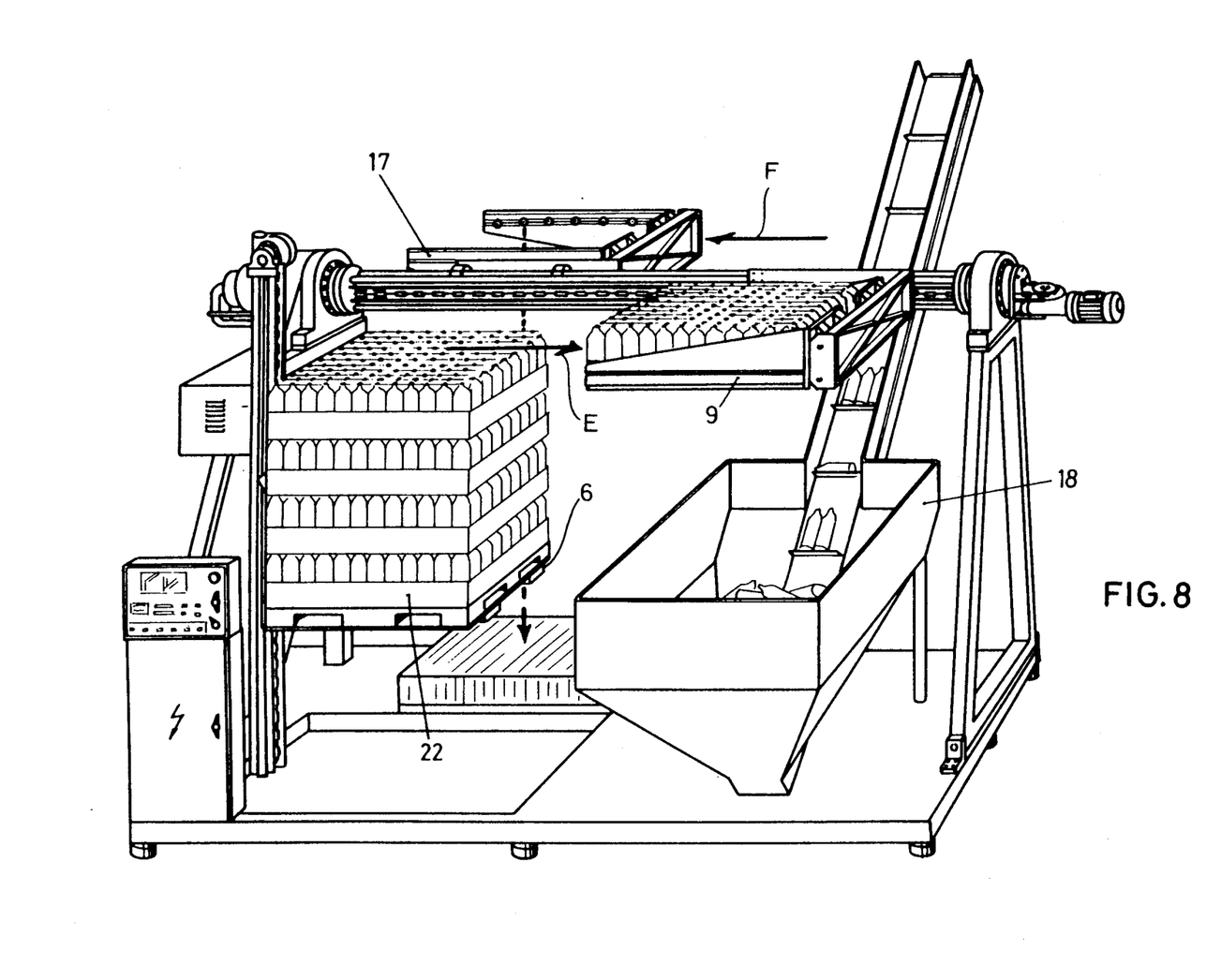

FIG. 8 shows displacement of tong 9 in the direction of arrow E towards the bottle recovery area while tong 17 is displaced to the packings area in the direction of arrow F with the jaws open.

This cycle is repeated during operation of the device. The invention is not limited to the embodiment described and represented in the drawings since some variants can be foreseen without being beyond the scope of the invention defined only by the appended claims. For example, the packing can be a tray, and have a slide that shall be previously taken apart; the jaw tong can be constituted by one or several arms, and have retaining means other than sucking disks such as adhesive, a hook system, etc.; the tong can be directly coupled to the re-erecting and lining-up machine 2, without the bottles passing through the recovery hopper; and the drive means can be of any other type such as hydraulic or pneumatic jacks, for example.

I claim:

1. Apparatus for handling containers arranged in groups on separate tray means, the groups on tray means being stacked, comprising:

a stack area for stacked groups of containers;

a recovery area spaced from said stack area;

lifting means at said stack area for receiving a stack of groups of containers on tray means;

elevating means engaging said lifting means for raising said lifting means intermittently a distance substantially equal to the height of at least one group of containers;

tong means releasably engageable with the uppermost tray means of the stack of containers for gripping said tray means and transporting said group of containers thereon from the stack to the recovery area and for inverting said tray means to dump said containers therein at said recovery area;

holding means on said tong means releasably engageable with said tray means for holding said tray means on said tong means during dumping and releasing said tray means after dumping the containers;

hopper means at said recovery area for receiving said containers;

first conveyor means for transporting said containers out of said hopper means; and second conveyor means for receiving and transporting said tray means away from the apparatus after release by said holding means;

said tong means comprising:
frame means, a rotatable beam rotatably supported on said frame means, longitudinal guide means on said beam comprising a plurality of shafts and sliding hub members thereon, jaw type gripper means movably supported on said guide means for longitudinal movement thereon and connected to at least two of said hub members, and drive means on said beam engaging said gripper means for moving said gripper means reciprocally on said beam comprising motoreducer means, pinion gear means rotatably mounted adjacent the ends of said beam, and endless chain means engaging said gear means, said motoreducer means, and said gripper means so that said motoreducer means drives said gripper means along said beam reciprocally between the stack area and the recovery area.

2. An apparatus as claimed in claim 1 and further comprising:

means for rotating said beam about the longitudinal axis thereof for rotating said gripper means substantially 180 degrees intermittently between an upright position on one side of said beam, for engaging and transporting a group of bottles, and an inverted position on the opposite side of said beam for dumping the bottles at the recovery area.

3. An apparatus as claimed in claim 2 wherein:

said jaw-type gripper means comprises two grippers disposed on opposite sides of said beam so that when one gripper is in position for engaging with a group of bottles at the stack position, the other gripper is in the inverted position at the recovery area; and control means for operating said tong means continuously so that said gripper means are operated between said upright and inverted positions.

4. Apparatus as claimed in claim 1 wherein:

said gripper means comprises a pair of jaws each having an inside for engaging said tray means; and said holding means comprises suction means on said insides of said jaws.

5. An apparatus as claimed in claim 4 and further comprising:

means for rotating said beam about the longitudinal axis thereof for rotating said gripper means substantially 180 degrees intermittently between an upright position on one side of said beam, for engaging and transporting a group of bottles and an inverted position on the opposite side of said beam for dumping the bottles at the recovery area.

6. An apparatus as claimed in claim 5 wherein:

said jaw-type gripper means comprises two grippers disposed on opposite sides of said beam so that when one gripper is in position for engaging with a group of bottles, the other gripper is in the inverted position at the recovery area; and control means for operating the tong means continuously so that said gripper means are operated between said upright and inverted positions.

* * * * *